(12) United States Patent
Wipasuramonton et al.

(10) Patent No.: US 8,267,423 B2
(45) Date of Patent: Sep. 18, 2012

(54) AIRBAG

(75) Inventors: Pongdet Paul Wipasuramonton, Rochester, MI (US); Mark Andrew Steinbach, Clawson, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 12/385,145

(22) Filed: Mar. 31, 2009

(65) Prior Publication Data

US 2010/0244415 A1    Sep. 30, 2010

(51) Int. Cl.
*B60R 21/232* (2011.01)
(52) U.S. Cl. .................. 280/730.2; 280/743.1
(58) Field of Classification Search ......... 280/730.2, 280/743.1
See application file for complete search history.

(56) References Cited

U.S. PATENT DOCUMENTS

| | | | |
|---|---|---|---|
| 5,114,180 A * | 5/1992 | Kami et al. ............... | 280/743.1 |
| 5,687,986 A * | 11/1997 | Nelsen et al. ............. | 280/728.2 |
| 5,782,489 A | 7/1998 | LaLonde et al. | |
| 6,113,141 A * | 9/2000 | Baker ...................... | 280/743.2 |
| 6,199,898 B1 * | 3/2001 | Masuda et al. ........... | 280/730.2 |
| 6,220,629 B1 * | 4/2001 | Wipasuramonton et al. ...................... | 280/743.1 |
| 6,355,123 B1 * | 3/2002 | Baker et al. ............... | 156/90 |
| 6,364,356 B1 * | 4/2002 | Keshavaraj ............... | 280/743.1 |
| 6,435,543 B1 * | 8/2002 | Magoteaux et al. ....... | 280/730.2 |
| 6,598,902 B2 * | 7/2003 | Keshavaraj ............... | 280/743.1 |
| 6,712,920 B2 * | 3/2004 | Masuda et al. ........... | 156/93 |
| 6,749,220 B1 * | 6/2004 | Wipasuramonton et al. ...................... | 280/743.1 |
| 6,758,492 B2 * | 7/2004 | Tesch ...................... | 280/730.2 |
| 6,883,826 B2 * | 4/2005 | Fujiwara ................... | 280/730.2 |
| 6,886,858 B2 * | 5/2005 | Olson ...................... | 280/743.2 |
| 6,971,665 B2 * | 12/2005 | Tanaka ..................... | 280/729 |
| 7,396,041 B2 * | 7/2008 | Noguchi et al. .......... | 280/730.2 |
| 7,401,805 B2 * | 7/2008 | Coon et al. ................ | 280/730.2 |
| 7,422,234 B2 * | 9/2008 | Huber et al. .............. | 280/730.2 |
| 7,581,755 B2 * | 9/2009 | Nagai et al. .............. | 280/743.1 |
| 7,597,348 B2 * | 10/2009 | Fukuda et al. ............. | 280/730.2 |
| 7,614,648 B2 * | 11/2009 | Heudorfer et al. ......... | 280/729 |
| 7,654,567 B2 * | 2/2010 | Taylor et al. .............. | 280/740 |
| 7,658,403 B2 * | 2/2010 | Kawabe et al. ............ | 280/730.2 |
| 2002/0020991 A1 * | 2/2002 | Tanase et al. ............. | 280/730.2 |
| 2002/0140211 A1 * | 10/2002 | Takahara .................. | 280/730.2 |
| 2004/0124615 A1 * | 7/2004 | Tanase et al. ............. | 280/730.2 |
| 2005/0212270 A1 * | 9/2005 | Wipasuramonton et al. ...................... | 280/730.2 |
| 2006/0237957 A1 | 10/2006 | Woydick | |
| 2006/0255570 A1 * | 11/2006 | Wipasuramonton et al. . | 280/729 |
| 2006/0273558 A1 * | 12/2006 | Breed et al. .............. | 280/730.2 |

* cited by examiner

*Primary Examiner* — Joseph Rocca
*Assistant Examiner* — Nicole Verley
(74) *Attorney, Agent, or Firm* — Foley & Lardner LLP

(57) ABSTRACT

A side airbag extends along a side of an interior roof of a vehicle and is configured to restrain a head of a vehicle occupant when the airbag is deployed. The airbag includes an inboard panel, an outboard panel, and one or more seams configured to join the inboard panel and the outboard panel. The at least one or more seams include first seam portions and second seam portions. The first seam portions are subject to higher stress than the second seam portions when the airbag inflates. The first seam portions are reinforced by sewing or by at least one bead of energy absorbent sealant or adhesive.

26 Claims, 3 Drawing Sheets

AIRBAG

BACKGROUND

The present disclosure relates generally to an airbag configured to deploy along an interior side of a vehicle. When inflated, the airbag is configured in the shape of a curtain. The present application is directed to a curtain airbag configured to more effectively restrain an occupant inside the vehicle when the vehicle is involved in a rollover or side impact type event.

The majority of airbag cushions are fabricated by a cut and sew process using linear fabrics or by a one-piece woven (OPW) process. In some cases, a sealant is placed between two layers of fabric prior to sewing in order to prevent leakage out of the cushion through the sewn seam. Reducing leakage provides for longer gas retention time. The sewing is typically applied along the entire seam throughout the cushion. The fabric may be coated to minimize gas leaking through the fabric. In the OPW cushions, the coating is typically applied on the outside because the inside is not accessible once the cushion is woven. Sewing of a large cushion, for example a head side airbag (inflatable curtain) can be time consuming.

It would be advantageous to provide a curtain airbag that takes less time to manufacture while also providing increased air tightness or gas retention time. It would also be advantageous to provide a curtain airbag with increased air tightness or gas retention time while costing less to fabricate and while using less thread material. In sum, it would be advantageous to provide a curtain airbag and airbag module that effectively restrains an occupant and is easier and less costly to manufacture.

SUMMARY

One embodiment of the disclosure relates to an airbag module for use in a vehicle to restrain an occupant of the vehicle in a side impact type collision. The airbag module includes an inflator configured to generate gas and an airbag coupled to the inflator and configured to deploy upon receiving gas from the inflator. The airbag includes a main chamber extending along a side of an interior roof of the vehicle and configured to restrain a head of a vehicle occupant when the airbag is deployed. The main chamber includes an inboard panel and an outboard panel joined together by seams. The seams include first seam portions and second seam portions. The first seam portions are subject to higher stress than the second seam portions when the airbag inflates. The first seam portions are reinforced by sewing or by at least one bead of energy absorbent sealant or adhesive.

Another embodiment of the disclosure relates to a side curtain airbag for use in a vehicle. The airbag includes a main chamber extending along a side of an interior roof of the vehicle and configured to restrain a head of a vehicle occupant when the airbag is deployed. The main chamber includes an inboard panel, an outboard panel, and one or more seams configured to join the inboard panel and the outboard panel. The at least one seams includes first seam portions and second seam portions. The first seam portions are subject to higher stress than the second seam portions when the airbag inflates. The first seam portions are reinforced by sewing or by at least one bead of energy absorbent sealant or adhesive.

Another embodiment of the disclosure relates to a side airbag extending along a side of an interior roof of a vehicle and configured to restrain a head of a vehicle occupant when the airbag is deployed. The airbag includes an inboard panel, an outboard panel, and one or more seams configured to join the inboard panel and the outboard panel. The at least one seams include first seam portions and second seam portions. The first seam portions are subject to higher stress than the second seam portions when the airbag inflates. The first seam portions are reinforced by sewing or by at least one bead of energy absorbent sealant or adhesive.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Figure 1:
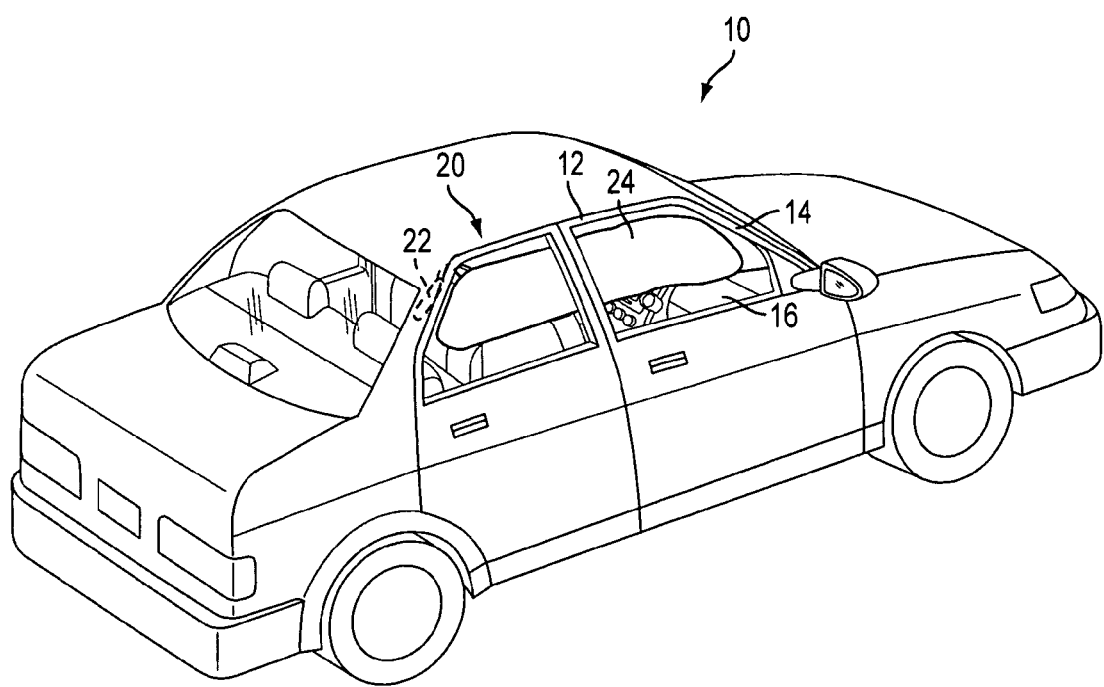
FIG. 1 is an isometric view of a vehicle including a side curtain airbag according to an exemplary embodiment.

Referring to FIG. 1, a vehicle 10 is shown including a side curtain airbag module 20 according to an exemplary embodiment. The side curtain airbag module 20 is provided to help restrain the occupants of the vehicle 10 in a side impact. The airbag module 20 includes an inflator or gas generator 22, such as a conventional stored gas or gas generating inflator, and an inflatable cushion or airbag 24. The curtain airbag 24 (shown unfolded) is preferably stored along the roof of the associated vehicle, for example along the vehicle roof side rail 12 above a window opening 16 in a conventional manner. The curtain airbag 24 is preferably secured in a folded state beneath a trim panel (not shown). The trim panel may be snapped, screwed, or otherwise secured in place over the inflator 22 and the packed, folded curtain airbag 24.

The inflator 22 supplies gas for inflation/deployment of the restraint curtain airbag. The inflator 22 may be mounted along the vehicle roof side rail or in one of pillars of the vehicle frame (e.g., the B, C, or A pillar). Thus, the inflator may be considered an end or mid mount inflator depending on vehicle configuration and desired airbag deployment characteristics. During a vehicle side impact crash or rollover event, the inflator 22 is activated to supply pressurized gas to inflate the curtain airbag 24. The inflation gas enters the curtain airbag 24 and drives the curtain airbag 24 away from a storage position and downward into a deployed position.

Figure 2:
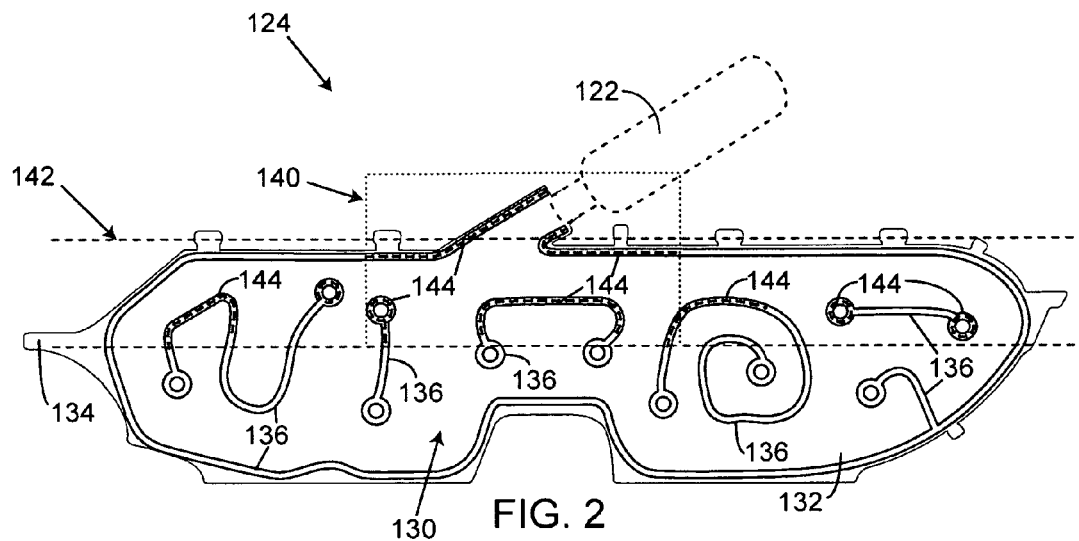
FIG. 2 is a side view of a side curtain airbag with reinforcing sewing lines according to an exemplary embodiment.
Figure 3:
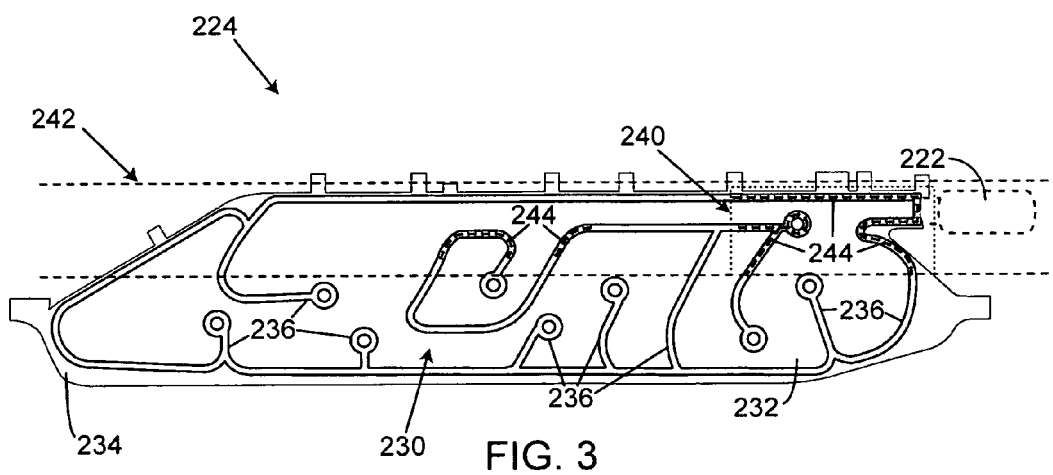
FIG. 3 is a side view of a side curtain airbag with reinforcing sewing lines according to another exemplary embodiment.

Referring to FIGS. 2 and 3, according to an exemplary embodiment, a curtain airbag 124, 224 includes a main chamber 130, 230 generally formed from a first panel 132, 232 (e.g., inboard panel, inner panel, front panel, etc.) and a second panel 134, 234 (e.g., outboard panel, outer panel, rear panel, etc.) that are coupled together by a plurality of seams 136, 236. According to an exemplary embodiment, the first panel 132, 232 and the second panel 134, 234 may be a coated or uncoated nylon or polyester fabric or a polymeric film. The first panel 132, 232 and second panel 134, 234 may be joined or coupled together by an energy source (e.g., heat sealing or welding without another medium) or a sealant or adhesive, for example a silicone, polyurethane, rubber cement, etc. that has low enough ductility to be a structural sealant or adhesive (a non-energy or low-energy absorbent sealant or adhesive) and hold the panels together without much stretch. A gas generator or inflator 122, 222 is coupled to the airbag 124, 224 to introduce gas into the main chamber 130, 230 for inflation.

The curtain airbag 124, 224 has an inflation zone 140, 240 that is near or in proximity to the inflator 122, 222. The pressure of inflowing gas from inflator 122, 222 in the inflation or sudden inflation zone 140, 240 is generally significantly higher than in the other areas of the airbag 124, 224, especially at the initial stage of deployment. According to an exemplary embodiment, the portions of the seams 136, 236 that are located in the inflation zone 140, 240 are reinforced with sewing at sewn portions 144, 244. According to some exemplary embodiments, the distance from the inflator 122, 222 (or opening leading to the inflator) to an edge of the inflation zone 140, 240 (the radius of the inflation zone 140, 240) may be at least about 250 mm. According to other exemplary embodiments, the distance from the inflator 122, 222 to an edge of the inflation zone 140, 240 may be of sufficient distance to include the first curvature of one of the seams 136, 236. According to still other exemplary embodiments, the distance from the inflator 122, 222 to an edge of the inflation zone 140, 240 may be at least about 250 mm if the first curvature is within the 250 mm or may be greater than 250 mm to include the first curvature of one of the seams 136, 236 if the curvature is greater than 250 mm from the inflator 122, 222.

The curtain airbag 124, 224 also has a high pressure/stress zone 142, 242 extending longitudinally across an upper portion of the airbag 124, 224. The pressure of inflowing gas from inflator 122, 222 in the high pressure/stress zone 142, 242 is generally higher than in the lower area of the airbag 124, 224. According to an exemplary embodiment, portions of the seams 136, 236 in high pressure/stress zone 142, 242 that have convex curvatures with respect to or facing towards the inflowing gas (pressure on the opposite side of the center of the curvature) are reinforced with sewing at sewing portions 144, 244. According to another exemplary embodiment, portions of the seams 136, 236 in high pressure/stress zone 142, 242 that have convex curvatures of less than about 100 mm are reinforced with sewing.

Figure 4:
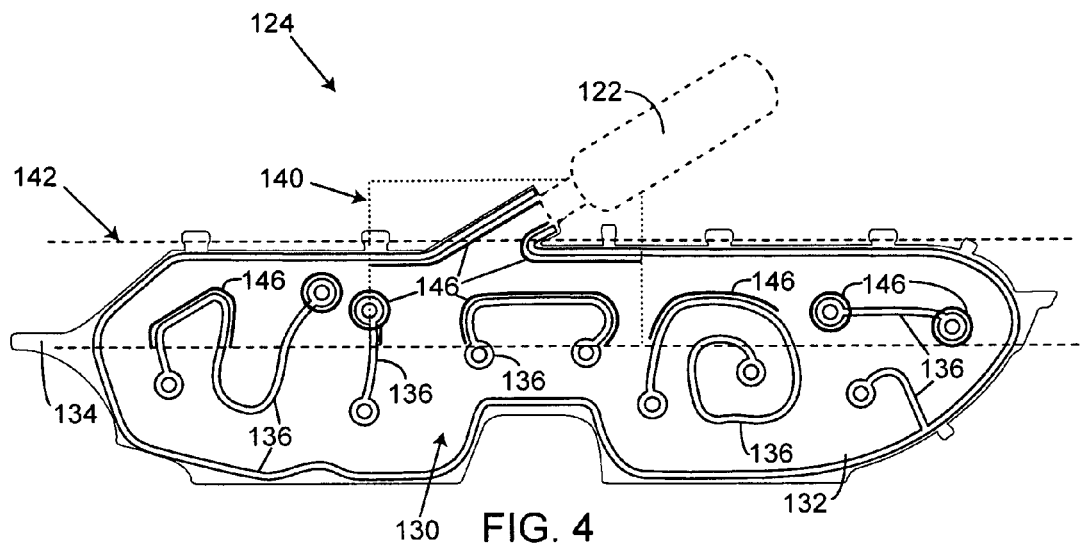
FIG. 4 is a side view of a side curtain airbag including reinforcing sealant or adhesive beads according to an exemplary embodiment.
Figure 5:
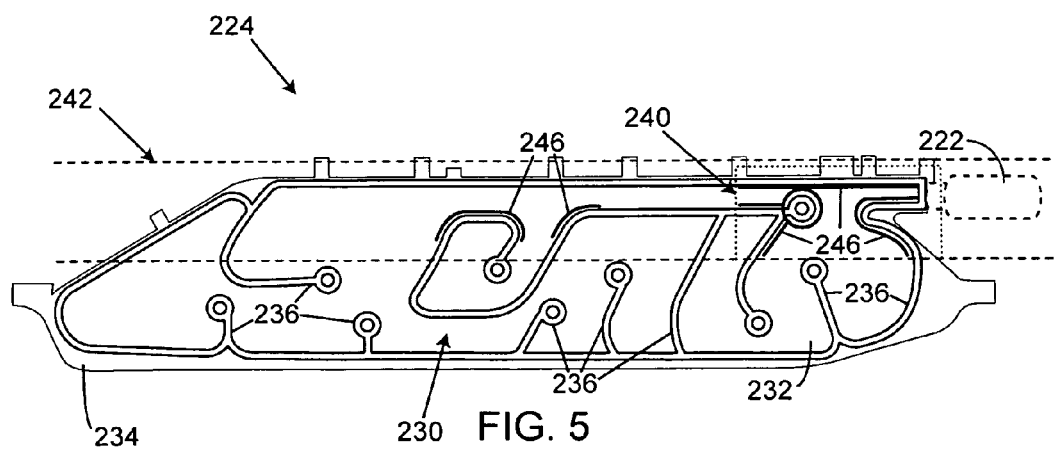
FIG. 5 is a side view of a side curtain airbag including reinforcing sealant or adhesive beads according to another exemplary embodiment.

Referring to FIGS. 4 and 5, the sewing reinforced portions of the seams 136, 236 in the inflation zone 140, 240 and in the high pressure/stress zone 142, 242 are reinforced with at least one bead of an energy absorbent sealant or adhesive 146, 246 instead of by sewing. The at least one bead of energy absorbent sealant or adhesive 146, 246 is applied along a high pressure side of the seams 136, 236, for example on the side of the convex curvatures of the seams 136, 236 in the inflation zone 140, 240 and the high pressure/stress zone 142, 242. The inner bead or beads of sealant or adhesive has a peel strength of less than or equal to that of the non-energy absorbent structural sealant or adhesive. According to various exemplary embodiments, the energy absorbent sealant may include a silicone, a polyurethane, a rubber cement, etc. that has higher ductility than the structural sealant or adhesive. The energy absorbent sealant may be the same material as the structural sealant but with a higher ductility or may be a different material with a higher ductility. For example, both the structural sealant and the energy absorbent material may be a silicone material, however the silicone material of the energy absorbent sealant is formulated or synthesized (e.g., via polymerization) to have a higher ductility or lower peel strength than the silicone material of the structural sealant.

According to various exemplary embodiments, the sewing reinforced portions of the seams 136, 236 in the inflation zone 140, 240 and in the high pressure/stress zone 142, 242 are the only portions of seams 136, 236 that are reinforced and the remaining portions of the seams are joined with a structural sealant or adhesive that is not as energy absorbent. According to other exemplary embodiments, only the portions of the seams 136, 236 in the inflation zone 140, 240 may be reinforced. According to still other exemplary embodiments, only the portions of the seams 136, 236 in the high pressure/stress zone 142, 242 may be reinforced. Because not all of the seams 136, 236 or all of the portions of the seams 136, 236 are reinforced, the airbag 124, 224 may be manufactured quicker and may cost less to produce, for example because of less or no usage of thread and because of less time to fabricate.

According to other exemplary embodiments, the curtain airbag 124, 224 may be divided into two or more compartments or chambers. Passages or ports may be provided between individual chambers such that the chambers are in fluid communication with each other. The various chambers, passages, and ports may also include inflation zones and/or high pressure/stress areas that can be reinforced by sewing and/or an energy absorbent sealant or adhesive. The curtain airbag 124, 224 may also include a plurality of un-inflated portions such as un-inflated portions that generally separate the chambers.

For purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent or releasable in nature.

The construction and arrangement of the elements of the curtain airbag as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited herein. For example, elements shown as integrally formed may be constructed of multiple parts or elements, the position of elements may be reversed or otherwise varied, and the nature or number of discrete elements or positions may be altered or varied. It should be noted that the elements and/or assemblies of the system may be constructed from any of a wide variety of materials that provide sufficient strength or durability, including any of a wide variety of moldable plastic materials in any of a wide variety of colors, textures and combinations. Other substitutions, modifications, changes and omissions may be made in the design, operating conditions and arrangement of the exemplary embodiments.

What is claimed is:

1. An airbag module for use in a vehicle to restrain an occupant of the vehicle in a side impact type collision, comprising:
an inflator configured to generate gas; and
an airbag coupled to the inflator and configured to deploy upon receiving gas from the inflator, the airbag comprising:
a main chamber extending along a side of an interior of the vehicle and configured to restrain a head of a vehicle occupant when the airbag is deployed, the main chamber comprising an inboard panel and an outboard panel joined together by seams, the seams comprising first seam portions and second seam portions, the first seam portions being subject to higher stress than the second seam portions when the airbag inflates, the first seam portions being reinforced by a reinforced portion including at least one bead of energy absorbent sealant or adhesive in contact with both the inboard panel and the outboard panel to thereby join the panels together,
wherein the main chamber includes an inflation zone proximate to the inflator, wherein pressure in the inflation zone is higher than pressure in other portions of the main chamber during an initial stage of deployment of the airbag; wherein the main chamber includes a high pressure zone located in an upper portion of the airbag, wherein pressure in the high pressure zone is higher than pressure in a lower portion of the airbag during inflow of gas into the main chamber from the inflator, wherein the high pressure zone includes the inflation zone, and
wherein the first seam portions and the reinforced portion are located only in the high pressure zone, and wherein the second seam portions are unreinforced.

2. The airbag module of claim 1, wherein the first seam portions are located proximate to the inflator and extend in convex curvatures with respect to gas flowing into the main chamber from the inflator.

3. The airbag module of claim 1, wherein the first seam portions are located proximate to the inflator.

4. The airbag module of claim 1, wherein the first seam portions extend in convex curvatures with respect to gas flowing into the airbag from the inflator.

5. The airbag module of claim 1, wherein the second seam portions comprise non-energy or low-energy absorbent sealant or adhesive, and wherein the first seam portions comprise the energy absorbent sealant or adhesive; the energy absorbent sealant or adhesive having a peel strength lower than the non-energy absorbent sealant or adhesive.

6. The airbag module of claim 5, wherein the non-energy or low-energy absorbent sealant or adhesive comprises at least one of a silicone, polyurethane, and rubber cement.

7. The airbag module of claim 1, wherein the energy absorbent sealant or adhesive comprises at least one of a silicone, polyurethane, and rubber cement.

8. The airbag module of claim 1, wherein the at least one bead of energy absorbent sealant or adhesive of the reinforced portion is positioned on a high pressure side of the first seam portions, the high pressure side of the first seam portions being located on an outer side of a convex curvature of the first seam portions.

9. The airbag module of claim 1, wherein a radius of the inflation zone is at least 250 mm.

10. The airbag module of claim 1, wherein the inflation zone includes a first curvature of at least one of the seams.

11. The airbag module of claim 1, wherein a radius of the inflation zone is greater than 250 mm if first curvatures of the seams are outside a radius of 250 mm.

12. The airbag module of claim 1, wherein the high pressure zone extends longitudinally across an upper portion of the airbag.

13. The airbag module of claim 1, wherein a seam in the high pressure zone with a convex curvature having a radius less than 100 mm is a first seam portion.

14. A side curtain airbag for use in a vehicle, comprising:
a main chamber extending along a side of an interior of the vehicle and configured to
restrain a head of a vehicle occupant when the airbag is deployed, the main chamber comprising:
an inboard panel;
an outboard panel; and
one or more seams configured to join the inboard panel and the outboard panel, the at least one or more seams comprising first seam portions and second seam portions, the first seam portions being subject to higher stress than the second seam portions when the airbag inflates, the first seam portions being reinforced by a reinforced portion including at least one bead of energy absorbent sealant or adhesive in contact with both the inboard panel and the outboard panel to thereby join the panels together,
wherein the main chamber includes an inflation zone proximate to the inflator, wherein pressure in the inflation zone is higher than pressure in other portions of the main chamber during an initial stage of deployment of the airbag; wherein the main chamber includes a high pressure zone located in an upper portion of the airbag, wherein pressure in the high pressure zone is higher than pressure in a lower portion of the airbag during inflow of gas into the main chamber from the inflator, wherein the high pressure zone includes the inflation zone, and
wherein the first seam portions and the reinforced portion are located only in the high pressure zone, and wherein the second seam portions are unreinforced.

15. The airbag module of claim 14, wherein the first seam portions are located proximate to the inflator and extend in convex curvatures with respect to flowing into the main chamber from the inflator.

16. The airbag module of claim 14, wherein the first seam portions are located proximate to the inflator.

17. The airbag module of claim 14, wherein the first seam portions extend in convex curvatures with respect to gas flowing into the main chamber from the inflator.

18. The airbag of claim 14, wherein the first seam portions comprise energy absorbent sealant or adhesive and the second seam portions comprise non-energy or low-energy absorbent sealant or adhesive, the energy absorbent sealant or adhesive having a peel strength lower than the non-energy absorbent sealant or adhesive.

19. The airbag module of claim 18, wherein the non-energy or low energy absorbent sealant or adhesive comprises at least one of a silicone, polyurethane, and rubber cement.

20. The airbag module of claim 14, wherein the energy absorbent sealant or adhesive comprises at least one of a silicone, polyurethane, and rubber cement.

21. A side airbag extending along a side of an interior of a vehicle and configured to restrain a head of a vehicle occupant when the airbag is deployed, comprising:
an inboard panel;
an outboard panel; and
one or more seams configured to join the inboard panel and the outboard panel to form a chamber between the inboard panel and the outboard panel, the at least one or more seams comprising first seam portions and second seam portions, the first seam portions being subject to higher stress than the second seam portions when the airbag inflates, the first seam portions including energy absorbing sealant or adhesive in contact with both the inboard panel and the outboard panel to thereby join the panels together, and wherein the first seam portion is reinforced by a reinforced portion comprising sewing extending through the energy absorbent sealant of the first seam portion and the inboard and outboard panels, wherein the chamber includes an inflation zone proximate to the inflator, wherein pressure in the inflation zone is higher than pressure in other portions of the chamber during an initial stage of deployment of the airbag; wherein the chamber includes a high pressure zone located in an upper portion of the airbag, wherein pressure in the high pressure zone is higher than pressure in a lower portion of the airbag during inflow of gas into the chamber from the inflator, wherein the high pressure zone includes the inflation zone, and wherein the first seam portions and the reinforced portion are located only in the high pressure zone, and wherein the second seam portions are unreinforced.

22. The airbag module of claim 21, wherein the first seam portions comprise seam portions located proximate to the inflator and extending in convex curvatures with respect to gas flowing into the airbag from the inflator.

23. The airbag module of claim 21, wherein the first seam portions are located proximate to the inflator.

24. The airbag module of claim 21, wherein the first seam portions extend in convex curvatures with respect to gas flowing into the airbag from an inflator.

25. The airbag of claim 21, wherein the second seam portions comprise non-energy or low-energy absorbent sealant or adhesive, the energy absorbent sealant or adhesive having a peel strength lower than the non-energy or low-energy absorbent sealant or adhesive.

26. The airbag module of claim 21, wherein the energy absorbent sealant or adhesive comprises at least one of a silicone, polyurethane, and rubber cement.

* * * * *